United States Patent
Ibrahim et al.

(10) Patent No.: US 11,423,779 B2
(45) Date of Patent: Aug. 23, 2022

(54) VEHICLE DETECTION SYSTEMS AND METHODS

(71) Applicant: Ford Global Technologies, LLC, Dearborn, MI (US)

(72) Inventors: Samer Ibrahim, Dearborn, MI (US); Sushanta Das, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 16/277,887

(22) Filed: Feb. 15, 2019

(65) Prior Publication Data
US 2020/0265716 A1    Aug. 20, 2020

(51) Int. Cl.
| | |
|---|---|
| G08G 1/0967 | (2006.01) |
| G08G 1/01 | (2006.01) |
| G08G 1/16 | (2006.01) |
| H04W 4/46 | (2018.01) |

(52) U.S. Cl.
CPC ..... *G08G 1/096791* (2013.01); *G08G 1/0141* (2013.01); *G08G 1/161* (2013.01); *G08G 1/166* (2013.01); *H04W 4/46* (2018.02)

(58) Field of Classification Search
CPC .......... G08G 1/096791; G08G 1/0141; G08G 1/161; G08G 1/166; H04W 4/46; H04W 4/023; H04W 4/40; B60W 50/0098; B60W 50/14; B60W 2050/0043; B60W 2050/008; B60W 2050/143; B60W 2050/146
See application file for complete search history.

(56) References Cited

U.S. PATENT DOCUMENTS

| | | | |
|---|---|---|---|
| 2007/0217780 A1* | 9/2007 | Hirooka | G06T 7/593 396/287 |
| 2017/0008454 A1* | 1/2017 | Christensen | B60Q 9/008 |
| 2017/0243485 A1 | 8/2017 | Rubin et al. | |

(Continued)

FOREIGN PATENT DOCUMENTS

WO    2017/033486 A1    3/2017

OTHER PUBLICATIONS

Hobert, et al. (2015). Enhancements of V2X Communication in Support of Cooperative Autonomous Driving. IEEE Communications Magazine. 53. 64-70. 10.1109/MCOM.2015.7355568.

*Primary Examiner* — Aniss Chad
*Assistant Examiner* — Chase L Cooley
(74) *Attorney, Agent, or Firm* — Brandon Hicks; Eversheds Sutherland (US) LLP

(57) ABSTRACT

Exemplary embodiments described in this disclosure are generally directed to vehicle detection systems and methods. In one exemplary embodiment, a vehicle detection system that is provided in a first vehicle receives a map generated by a vehicle detection system of a second vehicle. The map, which can be a cardinal map, for example, indicates a third vehicle that is detected by the vehicle detection system of the second vehicle and is undetectable by the first vehicle due to various reasons. For example, the first vehicle may fail to detect the third vehicle due to signal blocking caused by an intervening vehicle located between the first vehicle and the third vehicle, or due to the loss of radio-frequency (RF) signal reception by the vehicle detection system in the first vehicle. The second vehicle can detect the third vehicle by using radio-frequency (RF) signals and to convey the information to the first vehicle.

17 Claims, 6 Drawing Sheets

(56) References Cited

U.S. PATENT DOCUMENTS

| | | |
|---|---|---|
| 2018/0061237 A1* | 3/2018 | Erickson .............. G08G 1/0129 |
| 2018/0157036 A1 | 6/2018 | Choi et al. |
| 2018/0225963 A1 | 8/2018 | Kobayashi et al. |
| 2019/0143967 A1* | 5/2019 | Kuti ..................... G05D 1/0257 |
| | | 701/23 |
| 2019/0212725 A1* | 7/2019 | Woodrow ............ G05D 1/0011 |
| 2020/0132830 A1* | 4/2020 | Noujeim ............... G01S 13/872 |

* cited by examiner

VEHICLE DETECTION SYSTEMS AND METHODS

FIELD OF THE DISCLOSURE

This disclosure generally relates to automobiles, and more particularly relates to vehicle detection systems and methods.

BACKGROUND

Conventional ride services provided through vehicles such as taxis, shuttle buses, and limousines have been supplemented in the past few years by ride services such as Uber™ and Lyft™. Most of the automobiles used currently for providing these ride services are driver-operated vehicles. However, self-driven vehicles, often referred to as autonomous vehicles, have become the focus of a number of development efforts lately, and various ride service companies are considering the use of these vehicles for providing ride services. Some aspects that need to be addressed before autonomous vehicles can be used for such purposes include safety, legal liability, and public acceptance.

Foremost among safety issues is the need to ensure that autonomous vehicles are not involved in accidents, particularly accidents where human life is endangered. As far as the subject of legal liability is concerned, debate is still ongoing as to which entity (manufacturer, car owner, service provider, etc.) is liable to pay for damages incurred as a result of an accident caused by an autonomous vehicle. Public perception of accidents caused by autonomous vehicles, which correlates to public acceptance of autonomous vehicles, may be skewed to some extent at this time even if the accident rates for autonomous vehicles is equal to, or slightly lower, than the accident rates for driver-operated vehicles. Consequently, autonomous vehicle manufacturers are placing a lot of emphasis on developing various types of pedestrian detection systems, object detection systems, and vehicle detection systems. Such systems may also be employed in driver-operated vehicles. It is highly desirable that these systems be made foolproof and reliable because failing to detect a pedestrian, an object, and/or a vehicle can turn out to be hazardous.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
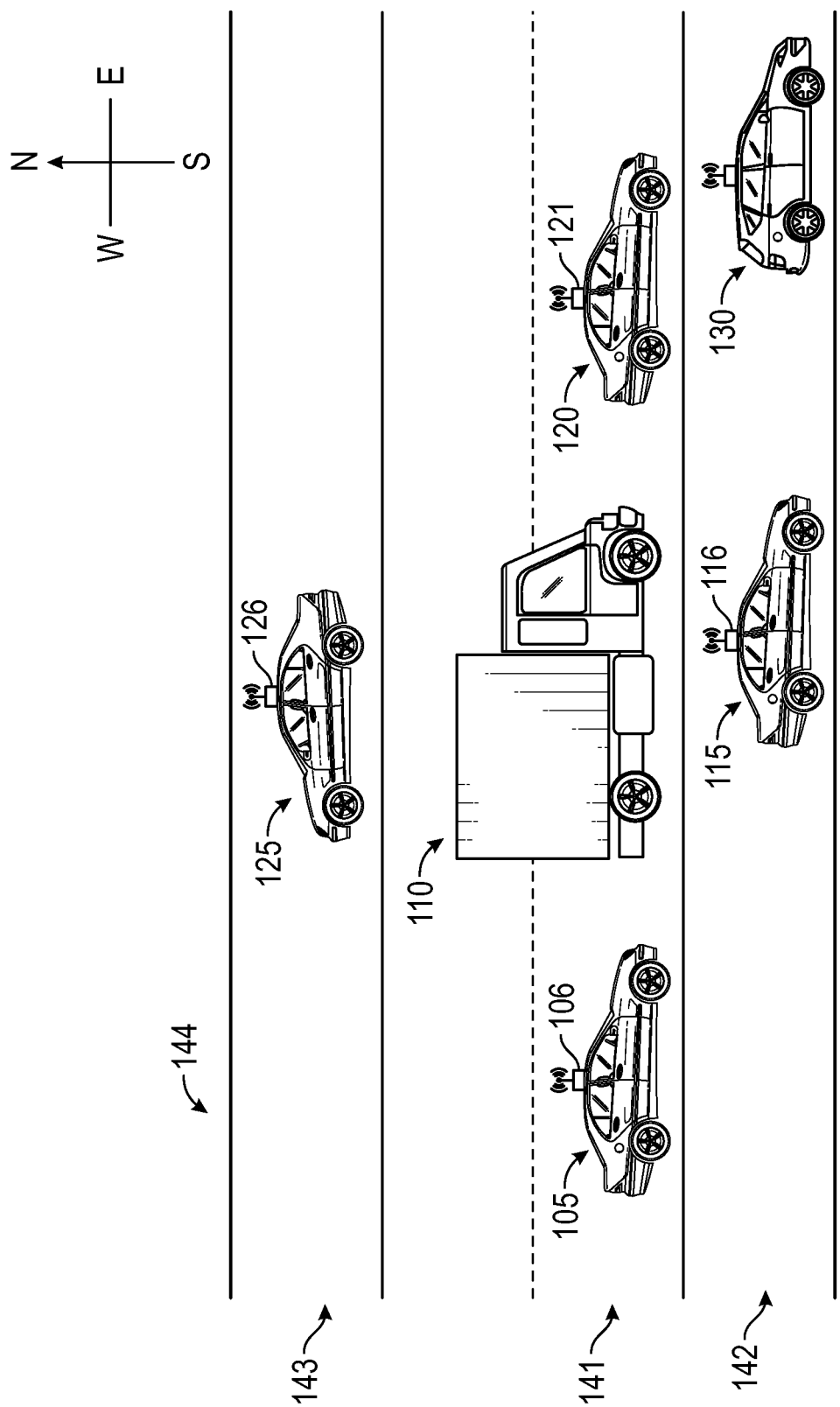
FIG. 1 illustrates an exemplary scenario pertaining to a vehicle equipped with a vehicle detection system in accordance with the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "automobile" and "vehicle" can be used interchangeably. The phrase "RF signal" as used herein generally refers to any of various types of wireless signals operating at various frequencies and may also include optical signals and microwave signals. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to vehicle detection systems and methods. In one exemplary embodiment, a vehicle detection system that is provided in a first vehicle receives a map generated by a vehicle detection system of a second vehicle. The map, which can be a cardinal map, for example, indicates a third vehicle that is detected by the vehicle detection system of the second vehicle and is undetectable by the first vehicle due to various reasons. For example, the first vehicle may fail to detect the third vehicle due to signal blocking caused by an intervening vehicle located between the first vehicle and the third vehicle, or due to the loss of radio-frequency (RF) signal reception by the vehicle detection system in the first vehicle. The second vehicle can detect the third vehicle by using the RF signals and to communicate with the first vehicle.

FIG. 1 illustrates an example scenario pertaining to a vehicle 105 that is equipped with a vehicle detection system 106 in accordance with the disclosure. In one exemplary embodiment, the vehicle 105 is an autonomous vehicle, and the vehicle detection system 106 is configured to cooperate with various components of the autonomous vehicle to assist in safely maneuvering the autonomous vehicle through traffic. In another exemplary embodiment, the vehicle 105 is a driver-operated vehicle, and the vehicle detection system 106 is configured to assist the driver in safely maneuvering the vehicle through traffic.

The vehicle detection system 106 can use radio-frequency (RF) signals and one or more communications formats for communicating with other vehicles that are equipped with similar vehicle detection systems. An exemplary communications format that is becoming popular and may become a standard for widespread use is generally referred to as vehicle-to-vehicle (V2V) communications. In this communications format, two or more vehicles that are equipped with V2V apparatuses can exchange information with each other about various other vehicles in the vicinity. The information can include speed and location data of various vehicles as well as other information such as a traffic accident or a stalled motorist in a driving lane. Another exemplary communications format that is also becoming popular is generally referred to as vehicle-to-everything (V2X) communications. In this communications system, a vehicle can not only communicate with other vehicles but can also communicate with intelligent objects such as an Internet-of-Things (IoT) device mounted on a fixture beside a road.

Vehicle 105 that is equipped with the vehicle detection system 106 is traveling east in a lane 141 of an expressway 144. In this exemplary scenario, vehicle 105 is traveling behind a truck 110 that is large in size and does not include equipment that would allow the truck 110 to wirelessly communicate with other vehicles on the road. In front of the truck 110 is a vehicle 120 that is also traveling east in the lane 141. The vehicle 120 includes a vehicle detection system 121 that can communicate with the vehicle detection system 106 provided in the vehicle 105. However, the RF signals transmitted by the vehicle detection system 121 of the vehicle 120 in the direction of the vehicle 105 are blocked by the truck 110. Consequently, the vehicle 105 is unaware of the vehicle 120 in the lane 141 ahead of the truck 110.

A vehicle 115 is traveling alongside the truck 110 in a lane 142 that is adjacent to the lane 141. The vehicle 115 includes a vehicle detection system 116 that can communicate with the vehicle detection system 106 provided in the vehicle 105 as well as with the vehicle detection system 121 provided in the vehicle 120. The truck 110 does not block the RF signals transmitted by the vehicle detection system 121 towards the vehicle detection system 116. Accordingly, the vehicle detection system 116 can generate information such as the location of the vehicle 120, the speed of the vehicle 120, and the orientation of the vehicle 120, and convey this information to the vehicle detection system 106 located in the vehicle 105. The information can be conveyed to the vehicle detection system 106 voluntarily or upon request by the vehicle detection system 106.

Information about the vehicle 120 can also be generated by a vehicle detection system 126 of a vehicle 125 traveling west in a lane 143 of the expressway 144 and conveyed to the vehicle detection system 106 located in the vehicle 105. The information generated by the vehicle detection system 116 and/or the vehicle detection system 126 can be conveyed to the vehicle detection system 106 in various formats.

In one example implementation, the information is conveyed to the vehicle detection system 106 in the form of data carried over RF signals. In another example implementation, the information is conveyed to the vehicle detection system 106 in the form of messages carried over RF signals. The data and/or messages can be processed by the vehicle detection system 106 to generate a first map that indicates various vehicles presently located in an area surrounding the vehicle 115 from which the data and/or messages are received. The first map, which includes the vehicle 120 that is undetectable by the vehicle detection system 106, provides various types of information about the vehicle 120 as well as other vehicles in the vicinity of the vehicle 115. Some examples of information provided by the first map are a speed of travel of the vehicle 120, a cardinal separation distance between the vehicle 120 and the truck 110, a cardinal separation distance between the vehicle 120 and the vehicle 105, a relative location of the vehicle 120 with respect to the vehicle 115, a relative orientation of the vehicle 120 with respect to the vehicle 115, a relative orientation of the vehicle 120 with respect to the vehicle 105, a vehicle identification (ID) of the vehicle 115, and a vehicle ID of the vehicle 120.

The vehicle 105 can also generate a second map to complement or supplement the first map that was generated using information received from the vehicle detection system 116 of the vehicle 115. The second map can include information pertaining to vehicles that are undetected by the vehicle detection system 116 of the vehicle 115 and/or is irrelevant to the vehicle 115. For example, the second map can be generated by using information transmitted by the vehicle detection system 126 of the vehicle 125 that is traveling in the opposite direction. The vehicle 125 is undetectable by the vehicle detection system 116 of the vehicle 115 because the truck 110 is located between the vehicle 115 and the vehicle 125.

The information derived from the first map and/or the second map can be used in various ways. For example, when the vehicle 105 is a driver-operated vehicle, an alert can be provided to the driver to make the driver aware of the vehicle 120 and to suggest maneuvering the vehicle 105 into the lane 142 from which the vehicle 120 is detectable. The alert can be provided to the driver in various ways. In one exemplary implementation, the alert can be an audible alert such as a computer-generated audio message or a beep. In another exemplary implementation, the alert can be conveyed to the driver in the form of a graphics display, such as a flashing icon in a display screen of a navigation system used by the driver.

When the vehicle 105 is an autonomous vehicle, the information obtained from the vehicle detection system 116 of the vehicle 115 can be processed by a computer in the vehicle detection system 106 and/or by other computers in the autonomous vehicle and used to manipulate an engine controller of the autonomous vehicle. The engine controller can provide appropriate control signals to operate the autonomous vehicle such as to increase a separation distance between the vehicle 105 and the truck 110 or to switch over from lane 141 to the lane 142. When in lane 142, the vehicle detection system 106 of the autonomous vehicle can detect the vehicle 120 without relying on information from the vehicle detection system 116 of the vehicle 115.

In another example implementation, the vehicle detection system 116 of the vehicle 115 generates a first map and transmits the first map to the vehicle detection system 106 of the vehicle 105 by using RF signals. The first map generated by the vehicle detection system 116 can be different than the first map (described above) that is generated by the vehicle detection system 106 of the vehicle 105 after receiving data or messages from the vehicle detection system 116. This first map, which is more relevant to the vehicle 115 than the vehicle 105, can include information about some vehicles, such as a vehicle 130 that is traveling ahead of the vehicle 115, that may not be directly relevant to the vehicle 105. The vehicle detection system 106 of the vehicle 105 may use this first map that is transmitted by the vehicle detection system 116 of the vehicle 115 to derive information about the vehicle 120. Alternatively, the vehicle detection system 106 of the vehicle 105 can use the first map to generate its own map that includes information contained in the first map as well as additional information such as information associated with the vehicle 125 traveling in the opposite direction.

Some or all of vehicles shown in FIG. 1 can transmit RF signals (carrying data, messages, and/or maps) using various timing schedules. In a first exemplary timing schedule, the vehicle detection system 116 of the vehicle 115 voluntarily transmits the RF signals on a periodic basis so as to provide information to all vehicles in the vicinity of the vehicle 115 on a regular basis. In one exemplary embodiment, the vehicle detection system 116 transmits the RF signal at a repetitive rate in a range from about 1 Hz to about 10 Hz.

In a second exemplary timing schedule, the vehicle detection system 116 of the vehicle 115 transmits the RF signals only in response to a request (such as a request originated by the vehicle detection system 106 of the vehicle 105). In some implementations, the RF signals may be specifically tailored to respond to the request. For example, the vehicle detection system 106 of the vehicle 105 may send out a request for information that would assist the vehicle detection system 106 to identify any undetectable vehicle traveling in front of the truck 110. The vehicle detection system 116 of the vehicle 115 may respond to the request by transmitting a message and/or the first map that provides information about the vehicle 120.

The RF signals transmitted by the vehicle detection system 116 of the vehicle 115 (either periodically or upon request) to the vehicle detection system 106 of the vehicle 105 can include not only information about various vehicles but also other types of information. A few examples of such information are a safety-related notification received by the vehicle detection system 116 from another vehicle detection system, a road hazard, a dangerous driving condition (ice patch, for example), an unsafe driver, and a traffic accident.

Figure 2:
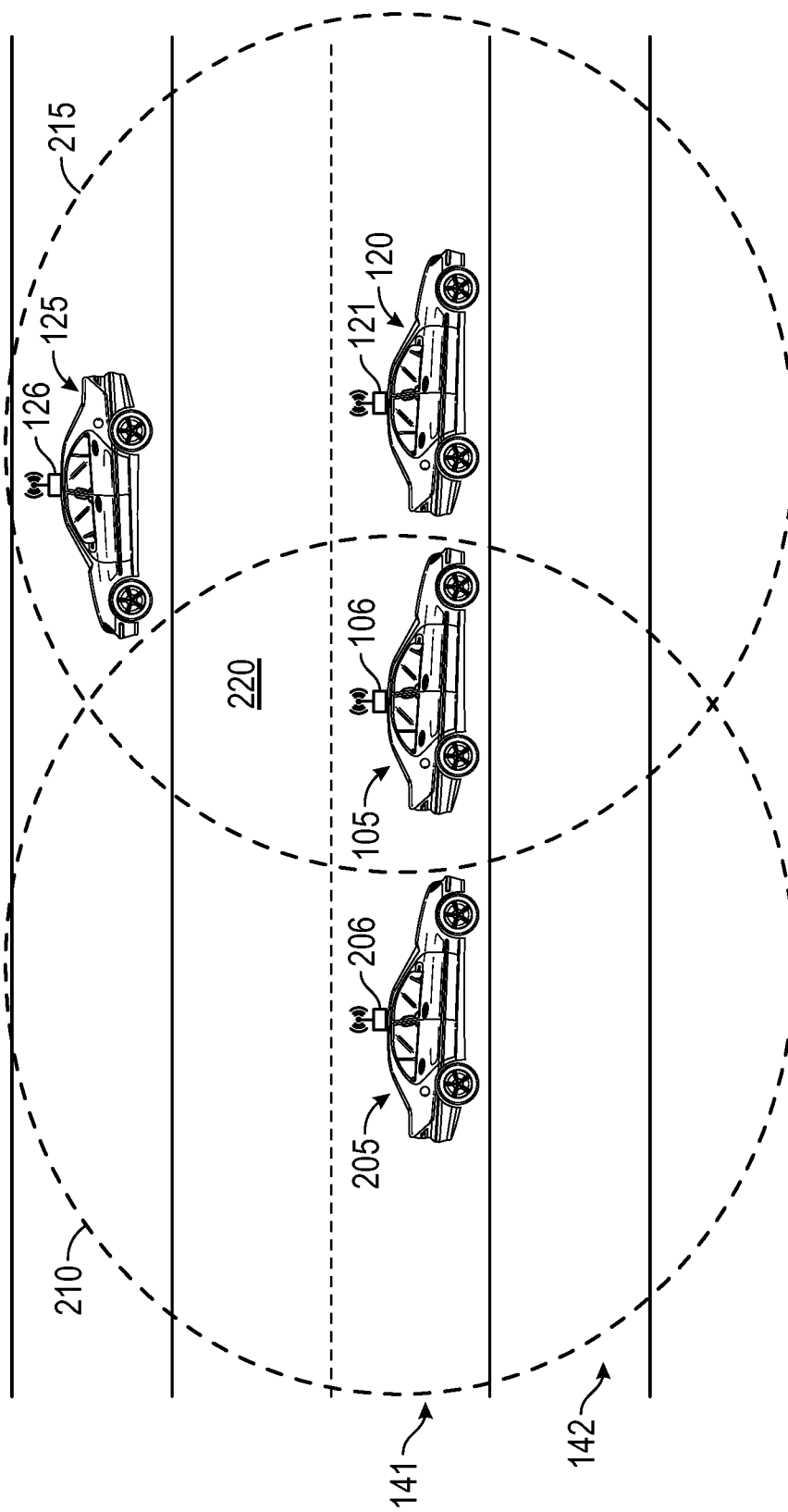
FIG. 2 illustrates an exemplary scenario in which the vehicle equipped with the vehicle detection system fails to detect another vehicle.

FIG. 2 illustrates an exemplary scenario where the vehicle detection system 106 of the vehicle 105 is unable to detect the vehicle 120 due to an RF signal reception issue. The vehicle 105 is traveling east in lane 141 of the expressway 144 and is sandwiched between the vehicle 120 in front and a vehicle 205 behind. The vehicle 205 is equipped with a vehicle detection system 206 having an RF signal transmission zone that is defined by a perimeter 210. The vehicle 120 is equipped with a vehicle detection system 121 that is similar to the vehicle detection system 206. The RF signal transmission zone of the vehicle detection system 121 is defined by a perimeter 215 that overlaps the perimeter 210. The overlap is indicated by a zone 220 in which an RF signal transmitted by the vehicle detection system 206 may conflict with another RF signal transmitted by the vehicle detection system 121. The conflict can lead to a cancellation or corruption of one or both RF signals periodically or sporadically. The vehicle detection system 106 of the vehicle 105 that is located in the zone 220 may consequently fail to receive and process RF signals transmitted by the vehicle detection system 121 of the vehicle 120. The loss of detection of the RF signals transmitted by the vehicle detection system 121 of the vehicle 120 can lead to problems. For example, when the vehicle 105 is an autonomous vehicle, the engine controller of the autonomous vehicle may be unaware of the vehicle 120 thereby creating the possibility of a rear-end collision with the vehicle 120.

Consequently, in accordance with the disclosure, the vehicle detection system 106 can be configured to receive RF signals from the vehicle detection system 126 of the vehicle 125, for example, and use these RF signals to detect the vehicle 120. The vehicle 125 is currently located outside the zone 220 and can generate a map that indicates the vehicle 120. The RF signals are used by the vehicle detection system 126 to convey the map to the vehicle detection system 106. The vehicle detection system 106 can use the map to detect the vehicle 120. Upon detection of the vehicle 120, the vehicle 105 can be moved outside the zone 220 such as by slowing down the vehicle 105 so as to increase a separation distance with respect to the vehicle 120, or by accelerating the vehicle 105 after switching over to the lane 142.

Figure 3:
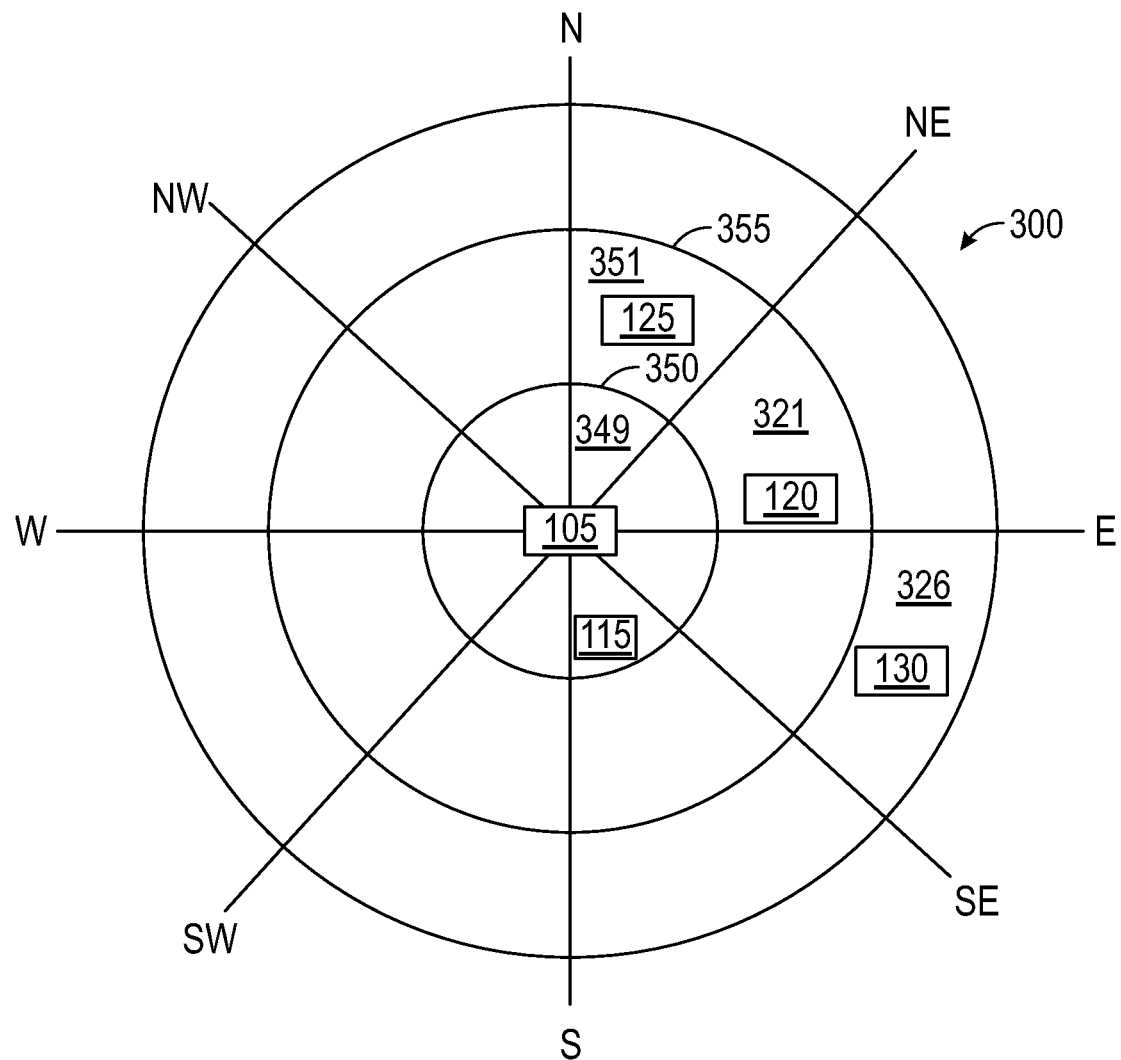
FIG. 3 shows a first exemplary map generated by a vehicle detection system in accordance with the disclosure.

FIG. 3 shows an exemplary map generated by a vehicle detection system such as the vehicle detection system 106 of the vehicle 105 that is shown in FIG. 1. The exemplary map is a cardinal map 300 that provides information about various vehicles in the vicinity of the vehicle 105 that can communicate with the vehicle 105 using RF signals. The information obtainable from the cardinal map 300 can include for example, the location of the various vehicles, a cardinal direction of travel of each of the various vehicles, an orientation of each of the various vehicles, and a relative distance between two or more vehicles.

In this exemplary embodiment, the cardinal map 300 is characterized by a set of concentric circles that are centered at a current location of the vehicle 105. An east-west axis of the cardinal map 300 may be aligned with the expressway 144, thereby allowing each of the various vehicles to be defined cardinally with respect to the vehicle 105. For example, the vehicle 125 may be defined as being currently located north-northeast (NNE) with respect to the vehicle 105 and traveling west. The vehicle 115 is located south-southeast (SSE) with respect to the vehicle 105 and is traveling east.

The exemplary cardinal map 300 shown in FIG. 3 can be a map that is generated by the vehicle detection system 106 of the vehicle 105 in one case or can be a map that is received from another vehicle detection system such as the vehicle detection system 116 of the vehicle 115 in another case. When received from the vehicle detection system 116, the cardinal map 300 can be processed by the vehicle detection system 106 to detect the vehicle 120 and/or to obtain information about various other vehicles in the vicinity.

Processing of the cardinal map 300 can be carried out by using one or more filters. One exemplary filter is based on distance values and can be used by the vehicle detection system 106 to obtain information about one or more vehicles such as the vehicle 120 that is relatively close to the vehicle 105 and disregard one or more vehicles such as the vehicle 130 that is relatively far from the vehicle 105. The various concentric circles of the cardinal map 300 may be used for defining distance values. Accordingly, a first concentric circle 350 defines a first area closest to the vehicle 105, a second concentric circle 355 defines a second area further away from the vehicle 105, and a third concentric circle 360 defines a third area furthest away from the vehicle 105.

Another exemplary filter is based on zones and can be used to obtain information about one or more vehicles such as the vehicle 120 that is in a zone 321 and disregard one or more vehicles such as the vehicle 125 that is in a zone 351. Each of the zones can be defined, for example, by using the concentric circles and radial lines that define cardinal directions. Accordingly, zone 321 can be defined by using the first concentric circle 350, the second concentric circle 355, a first radial line extending southwest (SW) to northeast (NE), and a second radial line extending west to east. Zone 351 can be defined by the first concentric circle 350, the second concentric circle 355, a first radial line extending southwest (SW) to northeast (NE), and a second radial line extending south to north.

Yet another exemplary filter can be defined on the basis of the RF signal strength and can be used to obtain information about one or more vehicles such as the vehicle 120, which offers a strong RF signal to the vehicle detection system 106 of the vehicle 105, and disregard one or more vehicles such as the vehicle 130 that offers a weak RF signal to the vehicle detection system 106. The weak RF signal is indicative of a greater separation distance between the vehicle 105 and the vehicle 130 than between the vehicle 105 and the vehicle 120.

The cardinal map 300 can be customized for use by any of the vehicles in accordance with individual preferences. For example, the vehicle detection system 116 of the vehicle 115 can customize the cardinal map 300 based on a relevance criterion so as to include only certain vehicles that are relevant to the vehicle 115 and omit other vehicles. Some exemplary vehicles that may be relevant can include the vehicle 120 and the vehicle 130 that are traveling ahead of the vehicle 115 in the same direction (east). Some exemplary vehicles that may be omitted can include the vehicle 125 that is traveling in the opposite direction on the expressway 144 and at a distance from the vehicle 115. When customized in this manner, the cardinal map 300 is an uncluttered version that may be useful to a driver of the vehicle 115 (when the vehicle 115 is a driver-operated vehicle) or for use by an autonomous vehicle (when the vehicle 115 is an autonomous vehicle).

The criteria used for customizing the cardinal map 300 can be conveyed by the vehicle detection system 116 of the vehicle 115 to all vehicle detection systems in the vicinity of the vehicle 115 so that the other vehicle detection systems can interpret the cardinal map 300 accordingly. For example, the vehicle detection system 106 of the vehicle 105 can interpret the cardinal map 300 received from the vehicle detection system 106 of the vehicle 105 in view of the relevance criterion used by the vehicle detection system 106. Accordingly, the vehicle detection system 106 of the vehicle 105 can interpret the cardinal map 300 from a point of view of the vehicle 115 and determine that the vehicle 125 has been omitted in the cardinal map 300.

The omission of the vehicle 125 in the cardinal map 300 provided by the vehicle detection system 116 of the vehicle 115 can be determined in various ways. In one exemplary implementation, the vehicle 105 generates its own cardinal map and compares the generated cardinal map to the cardinal map 300 provided by the vehicle detection system 116. The comparison not only indicates the omission of the vehicle 125 in the cardinal map 300 received from the vehicle detection system 116, but can also provide a location information of the vehicle 120 that is undetectable by the vehicle detection system 106 of the vehicle 105.

In another exemplary implementation, the vehicle detection system 106 of the vehicle 105 receives the cardinal map 300 from the vehicle detection system 116 of the vehicle 115 and also receives another cardinal map from the vehicle detection system 126 of the vehicle 125. The vehicle detection system 106 then compares the two cardinal maps. The comparison may not only identify that the vehicle 125 has been omitted in the cardinal map 300 received from the vehicle detection system 126 but can also provide a location information of the vehicle 120 that is undetectable by the vehicle detection system 106 of the vehicle 105.

Upon detecting the omission of the vehicle 125 in the cardinal map 300 provided by the vehicle detection system 116 of the vehicle 115, the vehicle detection system 106 of the vehicle 105 can generate a new cardinal map. The new cardinal map, which is operative as a customized version for use by the vehicle 105, can include the vehicle 125 and omit some other vehicles such as the vehicle 130 that is traveling in lane 142 way ahead of the vehicle 105. The omission of the vehicle 130 may be carried out by determining from the cardinal map 300 that the vehicle 130 is located in a zone 326 that is beyond a threshold distance from the zone 349 in which the vehicle 105 is located. The threshold distance can be selected by the vehicle detection system 106 of the vehicle 105 based on various factors such as a braking capability of the vehicle 105, weather conditions, traffic density, and the characteristics of the expressway 144 (divider if present, rough road surface, slick road surface, etc.).

The new cardinal map generated by the vehicle detection system 106 of the vehicle 105 can also be based on responses to one or more requests transmitted by the vehicle detection system 106 to vehicles in the vicinity of the vehicle 105. In one exemplary implementation, a request is transmitted seeking basic safety messages from various vehicles. The basic safety messages can provide information pertaining to various types of events such as emergency braking events, hazard-related events, and airbag deployment events. The information can be used by the vehicle 105 (driver-operated or autonomous) to modify a driving attribute such as braking, accelerating, changing lanes, and exiting the expressway 144. In some cases, the basic safety messages can be broadcast by a vehicle to all vehicles in the vicinity with or without a request being originated.

Figure 4:
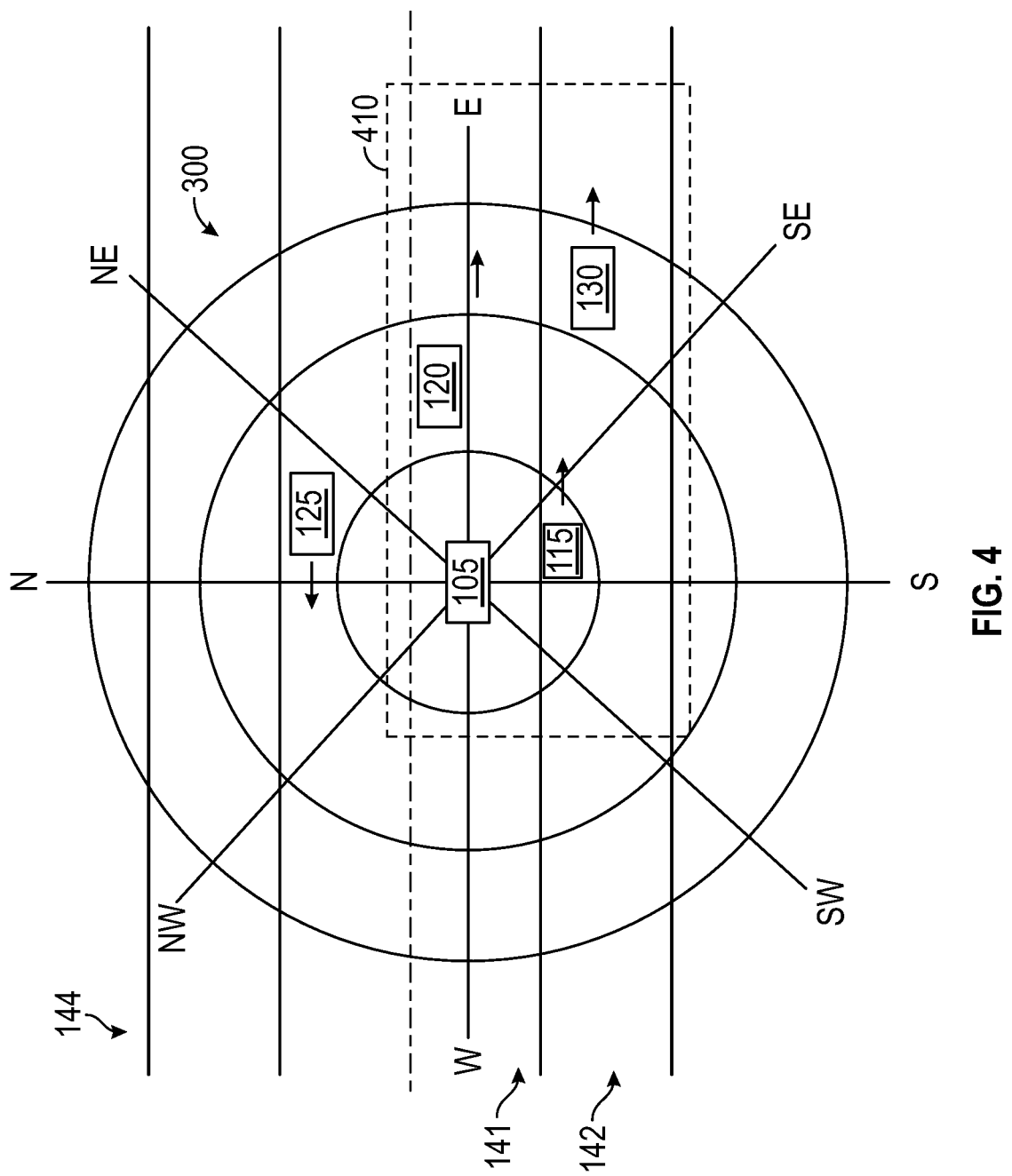
FIG. 4 shows an exemplary segment in a cardinal map generated by a vehicle detection system in accordance with the disclosure.

FIG. 4 shows an exemplary segment 410 defined in the cardinal map 300. One or more of such segments can be defined by the vehicle detection system 106 of the vehicle 105 so as to customize the cardinal map 300 for use by the vehicle 105. In the exemplary embodiment shown in FIG. 4, the segment 410 is a rectangular segment that encompasses several vehicles traveling in front of the vehicle 105 in both lane 141 and lane 142. In other exemplary embodiments, the segment can have a shape other than a rectangular shape such as an oval shape or a circular shape.

The dimensions of the segment 410 can be defined in various ways. In one exemplary implementation, the dimensions of the segment 410 can be defined by a driver of the vehicle 105 when the vehicle 105 is a driver-operated vehicle. The driver may define the segment 410 based on various factors such as a personal driving preference, a braking capability of the vehicle 105, weather conditions, traffic density, and the characteristics of the expressway 144. In one case, a first portion of the segment 410 can extend to a greater extent in a forward direction (in front of the vehicle 105) than a second portion of the segment 410 that extends in a backwards direction (behind the vehicle 105). In another case, the first segment can extend to the same extent as the second segment. In yet another case, the segment 410 can extend in width to encompass vehicles traveling in the opposite direction as well.

In another exemplary implementation, the dimensions of the segment 410 can be automatically defined by the vehicle detection system 106 when the vehicle 105 is an autonomous vehicle. The shape and dimensions of the segment 410 can be based on various factors such as a braking capability of the vehicle 105, weather conditions, traffic density, and the characteristics of the expressway 144. The positional characteristics of the segment 410 with respect to the vehicle 105 can also be defined automatically by the vehicle detection system 106 based on the various factors.

Figure 5:
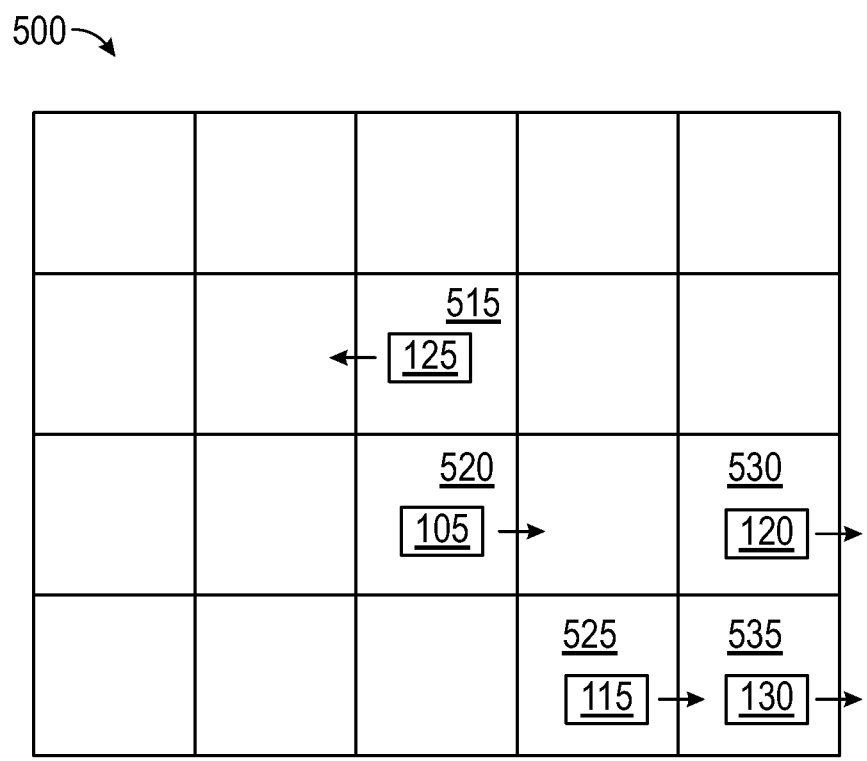
FIG. 5 shows a second exemplary map generated by a vehicle detection system in accordance with the disclosure.

FIG. 5 shows an exemplary map 500 generated by a vehicle detection system such as the vehicle detection system 116 of the vehicle 115 or the vehicle detection system 106 of the vehicle 105, in accordance with the disclosure. The exemplary map 500 has a rectangular shape that is characterized by a grid and provides information about various vehicles in the vicinity of the vehicle 115, for example. The information obtainable from the map 500 can include, for example, the location of the various vehicles, a direction of travel of each of the various vehicles, an orientation of each of the various vehicles, and a relative distance between two or more vehicles. In this exemplary illustration, the vehicle 105 is located in a grid segment 520, the vehicle 115 is located in a grid segment 525, the vehicle 120 is located in a grid segment 530, the vehicle 130 is located in a grid segment 535, and the vehicle 125 is located in a grid segment 515.

Figure 6:
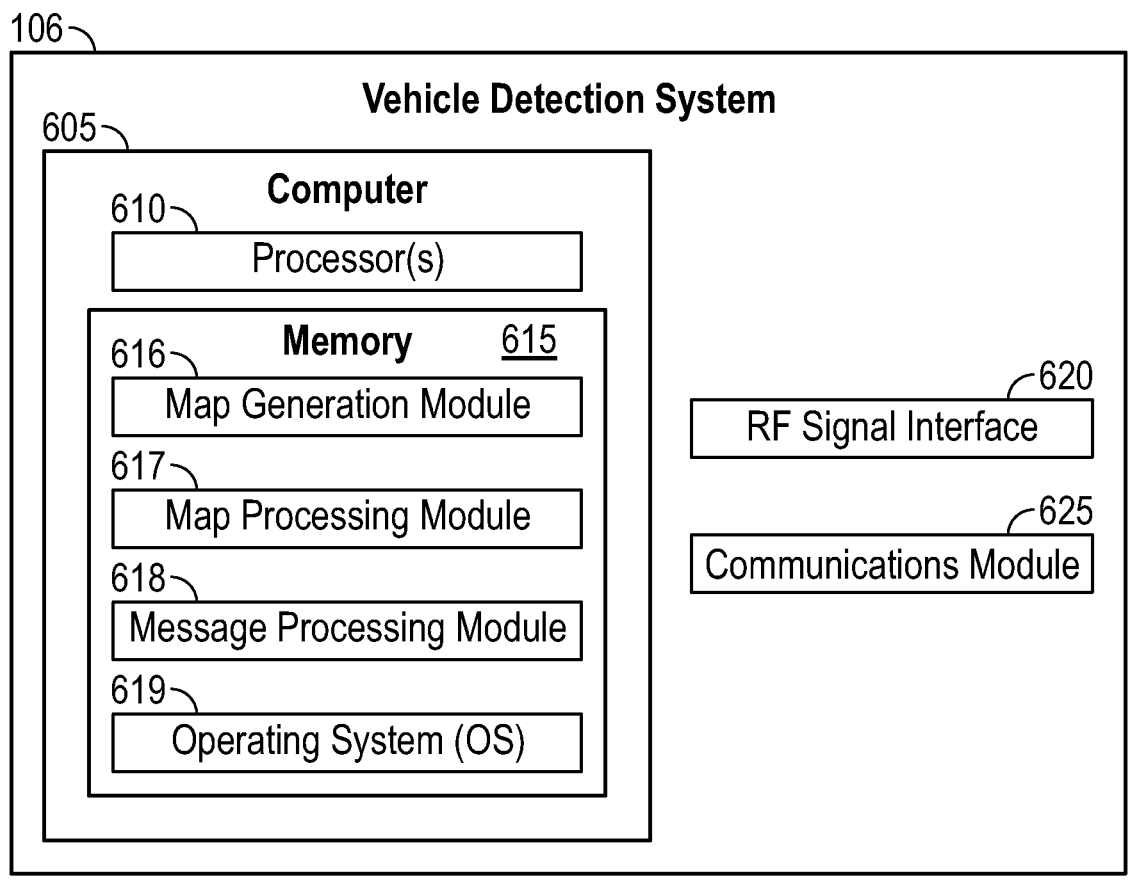
FIG. 6 shows some components of a vehicle detection system in accordance with an exemplary embodiment of the disclosure.

FIG. 6 shows some exemplary components of the vehicle detection system 106 in accordance with an embodiment of the disclosure. Other vehicle detection systems such as the vehicle detection system 116, the vehicle detection system 121, and the vehicle detection system 126 can include substantially similar components. The exemplary components include a computer 605 that has a processor 610 and a memory 615. The memory 615, which is one example of a non-transitory computer-readable medium, may be used to store an operating system (OS) 619 and various other code modules such as a map generation module 616, a map processing module 617, and a message processing module 618. The vehicle detection system 106 can further include elements such as an RF signal interface 620 and a communications module 625. The various code modules can be executed for carrying out various operations of the vehicle detection system 106 in accordance with the disclosure.

The RF signal interface 620 can be configured to receive RF signals transmitted by various vehicle detection systems. In an exemplary implementation, the RF signal interface 620 can include an RF signal receiver and an RF signal transmitter (or a transceiver). The communications module 625 can be coupled to the RF signal interface 620 for operating upon the signals that are received by the RF signal interface 620 from one or more vehicle detection systems and for providing signals for transmission by the RF signal interface 620 to one or more vehicles.

In one exemplary embodiment, the RF signals provided by the communications module 625 to the RF signal interface 620 for transmission, and/or the RF signals received from the RF signal interface 620, can incorporate a vehicle-to-vehicle (V2V) messaging format. In another exemplary embodiment, the RF signals provided by the communications module 625 to the RF signal interface 620 for transmission and/or received from the RF signal interface 620 can incorporate a vehicle-to-everything (V2X) messaging format.

The processor 610 can be configured to interact with the communications module 625 for operating on the information carried by the RF signals. The map generation module 616 can include one or programs that are executed by the processor 610 (using information provided by the communications module 625) for generating one or more maps such as the cardinal map 300 shown in FIG. 3 and/or the map 500 shown in FIG. 5. The map processing module 617 can process the maps generated by the map generation module 616 and/or the maps received by the communications module 625 from the other vehicles. The message processing module 618 is an optional module that can be omitted in implementations where the information received from the communications module 625 does not involve messages. The message processing module 618 can process messages received from the communications module 625 and/or provide to the communications module 625, messages for transmission to other vehicles.

The memory 615 can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to computers such as the computer 605 may be implemented by computer-executable instructions stored on one or more non-transitory computer-readable media such as the memory 615, that, when executed by one or more processors such as the processor 610, perform the recited operations. Generally, computer-executable instructions include routines, programs, objects, components, data structures, and the like that perform particular functions or implement particular abstract data types.

Example Embodiments

In some instances, the following examples may be implemented together or separately by the systems and methods described herein.

Example 1 may include a method comprising: receiving, by a first vehicle detection system of a first vehicle, a first map generated by a second vehicle detection system of a second vehicle, the first map indicating a present location of at least a third vehicle, and the second vehicle detection system configured to use one or more radio-frequency (RF)

signals for detecting the third vehicle; and determining, by a first computer in the first vehicle detection system, by processing the first map, at least a relative location of the third vehicle with respect to the first vehicle.

Example 2 may include the method of example 1, wherein the first vehicle detection system is configured to communicate with the second vehicle detection system using one of a vehicle-to-vehicle (V2V) communications format or a vehicle-to-everything (V2X) communications format, and wherein the third vehicle is undetectable by the first vehicle detection system during at least a first time period when the first vehicle detection system is receiving the one or more radio-frequency (RF) signals from the second vehicle detection system.

Example 3 may include the method of example 2 and/or some other example herein, wherein the third vehicle is undetectable by the first vehicle detection system due to a loss of radio-frequency (RF) signal reception at an antenna of the first vehicle detection system.

Example 4 may include the method of example 2 and/or some other example herein, wherein the first map is a cardinal map that indicates a cardinal direction of travel of the third vehicle.

Example 5 may include the method of example 4 and/or some other example herein, further comprising: partitioning, by the first computer, the cardinal map into a set of segments; and processing, by the first computer, a first segment in the set of segments for determining one or more of a cardinal direction of travel of the third vehicle with respect to the first vehicle, a cardinal separation distance between the third vehicle and the first vehicle, and a cardinal orientation of the third vehicle with respect to the first vehicle.

Example 6 may include the method of example 1 and/or some other example herein, further comprising: generating, by the at least the first computer of the first vehicle, a second map comprising a location information of at least the second vehicle.

Example 7 may include the method of example 6 and/or some other example herein, wherein the first map is a first cardinal map and the second map is a second cardinal map, and wherein determining, by the first computer, the relative location of the third vehicle with respect to the first vehicle comprises: comparing the second cardinal map to the first cardinal map.

Example 8 may include a method comprising: receiving, by a first vehicle detection system of a first vehicle, one or more radio-frequency (RF) signals transmitted by a second vehicle detection system of a second vehicle; and processing, by the first vehicle detection system of the first vehicle, the one or more radio-frequency (RF) signals to detect a third vehicle that is undetectable by the first vehicle detection system during at least a first time period when receiving the one or more radio-frequency (RF) signals from the second vehicle detection system.

Example 9 may include the method of example 8, wherein the first vehicle detection system is configured to communicate with the second vehicle detection system using one of a vehicle-to-vehicle (V2V) communications format or a vehicle-to-everything (V2X) communications format for receiving the one or more radio-frequency (RF) signals.

Example 10 may include the method of example 9 and/or some other example herein, wherein the one or more radio-frequency (RF) signals are utilized to propagate a first map from the second vehicle detection system to the first vehicle detection system, and wherein processing the one or more radio-frequency (RF) signals by the first vehicle detection system to detect the third vehicle comprises processing the first map to detect the third vehicle.

Example 11 may include the method of example 10 and/or some other example herein, wherein the first map is a first cardinal map that indicates a cardinal direction of travel of the third vehicle.

Example 12 may include the method of example 11 and/or some other example herein, wherein the first vehicle detection system of the first vehicle includes a first computer, and further comprising: partitioning, by the first computer, the first cardinal map into a set of segments; and processing, by the first computer, a first segment in the set of segments for determining one or more of a cardinal direction of travel of the third vehicle with respect to the first vehicle, a cardinal separation distance between the third vehicle and the first vehicle, and a cardinal orientation of the third vehicle with respect to the first vehicle.

Example 13 may include the method of example 11 and/or some other example herein, wherein the first vehicle detection system of the first vehicle includes a first computer, and further comprising: generating, by the at least the first computer, a second cardinal map comprising a location information of at least the second vehicle.

Example 14 may include the method of example 13 and/or some other example herein, further comprising: determining, by the first computer, a relative location of the third vehicle with respect to the first vehicle by comparing the second cardinal map to the first cardinal map.

Example 15 may include a system comprising: a first vehicle detection system comprising: a communications module; at least one memory that stores computer-executable instructions; and at least one processor configured to access the at least one memory and execute the computer-executable instructions to at least: receive, through the communications module, from a second vehicle detection system of a second vehicle, one or more radio-frequency (RF) signals; and processing the one or more radio-frequency (RF) signals to detect a third vehicle that is undetectable by the first vehicle detection system during at least a first time period when the communications module is receiving the one or more radio-frequency (RF) signals from the second vehicle detection system.

Example 16 may include the system of example 15, wherein the communications module of the first vehicle detection system is configured to communicate with a communications module of the second vehicle detection system using one of a vehicle-to-vehicle (V2V) communications format or a vehicle-to-everything (V2X) communications format when receiving the one or more radio-frequency (RF) signals.

Example 17 may include the system of example 16 and/or some other example herein, wherein the one or more radio-frequency (RF) signals are utilized to transport a first map from the second vehicle detection system to the first vehicle detection system, and wherein processing the one or more radio-frequency (RF) signals to detect the third vehicle comprises processing the first map to detect the third vehicle.

Example 18 may include the system of example 17 and/or some other example herein, wherein the first map is a first cardinal map, the first cardinal map indicating a cardinal direction of travel of the third vehicle.

Example 19 may include the system of example 18 and/or some other example herein, wherein the first vehicle detection system is located in a first vehicle, and wherein the at least one processor is configured to access the at least one memory and execute additional computer-executable instructions comprising: partitioning the first cardinal map into a set of segments; and processing a first segment in the set of segments for determining one or more of a cardinal orientation of the third vehicle with respect to the first vehicle, a cardinal direction of travel of the third vehicle with respect to the first vehicle, and a cardinal separation distance between the third vehicle and the first vehicle.

Example 20 may include the system of example 18 and/or some other example herein, wherein the first vehicle detection system is located in a first vehicle, and wherein the at least one processor is configured to access the at least one memory and execute additional computer-executable instructions comprising: generating a second cardinal map comprising a location information of at least the second vehicle; and determining a relative location of the third vehicle with respect to the first vehicle by comparing the second cardinal map to the first cardinal map.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component That which is claimed is:

1. A method comprising:
   transmitting, by a first vehicle detection system of a first vehicle, a request to identify vehicles undetectable by the first vehicle;
   receiving, responsive to the request, by the first vehicle detection system, a first map generated by a second vehicle detection system of a second vehicle, the first map indicating a present location of at least a third vehicle, and the second vehicle detection system configured to use one or more radio-frequency (RF) signals for detecting the third vehicle;
   determining, by a first computer in the first vehicle detection system, by processing the first map, at least a relative location of the third vehicle with respect to the first vehicle;
   determining, by the first computer in the first vehicle detection system, that the third vehicle is within a threshold distance based on a plurality of factors, wherein the plurality of factors comprises a braking capability of the first vehicle, weather conditions, traffic density, and characteristics of a road;
   presenting, by the first computer in the first vehicle detection system, the relative location of the third vehicle with respect to the first vehicle on the first map; and
   operating, based on the determination that the third vehicle is within the threshold distance, the first vehicle to increase a separation distance between the third vehicle and the first vehicle or to change lanes,
   wherein the first map is a cardinal map that indicates a cardinal direction of travel of the third vehicle, and wherein the cardinal map is partitioned into a set of segments that is defined by a user and is based at least in part on the plurality of factors.

2. The method of claim 1, wherein the first vehicle detection system is configured to communicate with the second vehicle detection system using one of a vehicle-to-vehicle (V2V) communications format or a vehicle-to-everything (V2X) communications format, and wherein the third vehicle is undetectable by the first vehicle detection system during at least a first time period when the first vehicle detection system is receiving the one or more radio-frequency (RF) signals from the second vehicle detection system.

3. The method of claim 2, wherein the third vehicle is undetectable by the first vehicle detection system due to a loss of radio-frequency (RF) signal reception at an antenna of the first vehicle detection system.

4. The method of claim 1, further comprising:
   processing, by the first computer, a first segment in the set of segments for determining one or more of a cardinal direction of travel of the third vehicle with respect to the first vehicle, a cardinal separation distance between the third vehicle and the first vehicle, and a cardinal orientation of the third vehicle with respect to the first vehicle.

5. The method of claim 1, further comprising:
   generating, by the at least the first computer of the first vehicle, a second map comprising a location information of at least the second vehicle.

6. The method of claim 5, wherein the first map is a first cardinal map partitioned into a first set of segments defined by a first user and the second map is a second cardinal map partitioned into a second set of segments defined by a second user, and wherein determining, by the first computer, the relative location of the third vehicle with respect to the first vehicle comprises:
   comparing the second cardinal map to the first cardinal map.

7. A method comprising:
   transmitting, by a first vehicle detection system of a first vehicle, a request to identify vehicles undetectable by the first vehicle;
   receiving, responsive to the request, by the first vehicle detection system, one or more radio-frequency (RF) signals transmitted by a second vehicle detection system of a second vehicle;
   processing, by the first vehicle detection system of the first vehicle, the one or more radio-frequency (RF) signals to detect a third vehicle that is undetectable by the first vehicle detection system during at least a first time period when receiving the one or more radio-frequency (RF) signals from the second vehicle detection system;
   determining, by the first vehicle detection system of the first vehicle, that the third vehicle is within a threshold distance based on a plurality of factors, wherein the plurality of factors comprises a braking capability of the first vehicle, weather conditions, traffic density, and characteristics of a road;
   presenting, by the first vehicle detection system of the first vehicle, a relative location of the third vehicle with respect to the first vehicle on a first map; and
   operating, based on the determination that the third vehicle is within the threshold distance, the first vehicle to increase a separation distance between the third vehicle and the first vehicle or to change lanes,
   wherein the first map is a cardinal map that indicates a cardinal direction of travel of the third vehicle, and wherein the cardinal map is partitioned into a set of segments that is defined by a user and is based at least in part on the plurality of factors.

8. The method of claim 7, wherein the first vehicle detection system is configured to communicate with the second vehicle detection system using one of a vehicle-to-vehicle (V2V) communications format or a vehicle-to-everything (V2X) communications format for receiving the one or more radio-frequency (RF) signals.

9. The method of claim 8, wherein the one or more radio-frequency (RF) signals are utilized to propagate a first map from the second vehicle detection system to the first vehicle detection system, and wherein processing the one or more radio-frequency (RF) signals by the first vehicle detection system to detect the third vehicle comprises processing the first map to detect the third vehicle.

10. The method of claim 7, wherein the first vehicle detection system of the first vehicle includes a first computer, and further comprising:
processing, by the first computer, a first segment in the set of segments for determining one or more of a cardinal direction of travel of the third vehicle with respect to the first vehicle, a cardinal separation distance between the third vehicle and the first vehicle, and a cardinal orientation of the third vehicle with respect to the first vehicle.

11. The method of claim 7, wherein the first vehicle detection system of the first vehicle includes a first computer, and further comprising:
generating, by the at least the first computer, a second cardinal map comprising a location information of at least the second vehicle.

12. The method of claim 11, further comprising:
determining, by the first computer, a relative location of the third vehicle with respect to the first vehicle by comparing the second cardinal map to the first cardinal map, wherein the first cardinal map is partitioned into a first set of segments defined by a first user, and wherein the second cardinal map is partitioned into a second set of segments defined by a second user.

13. A system comprising:
a first vehicle detection system comprising:
a communications module;
at least one memory that stores computer-executable instructions; and
at least one processor configured to access the at least one memory and execute the computer-executable instructions to at least:
transmit, through the communications module, a request to identify vehicles undetectable by a first vehicle comprising the first vehicle detection system;
receive, responsive to the request, through the communications module, from a second vehicle detection system of a second vehicle, one or more radio-frequency (RF) signals;
processing the one or more radio-frequency (RF) signals to detect a third vehicle that is undetectable by the first vehicle detection system during at least a first time period when the communications module is receiving the one or more radio-frequency (RF) signals from the second vehicle detection system;
determine that the third vehicle is within a threshold distance based on a plurality of factors, wherein the plurality of factors comprises a braking capability of the first vehicle, weather conditions, traffic density, and characteristics of a road;
present a relative location of the third vehicle with respect to the first vehicle on a first map; and
operate, based on the determination that the third vehicle is within the threshold distance, the first vehicle to increase a separation distance between the third vehicle and the first vehicle or to change lanes,
wherein the first map is a cardinal map that indicates a cardinal direction of travel of the third vehicle, and wherein the cardinal map is partitioned into a set of segments that is defined by a user and is based at least in part on the plurality of factors.

14. The system of claim 13, wherein the communications module of the first vehicle detection system is configured to communicate with a communications module of the second vehicle detection system using one of a vehicle-to-vehicle (V2V) communications format or a vehicle-to-everything (V2X) communications format when receiving the one or more radio-frequency (RF) signals.

15. The system of claim 14, wherein the one or more radio-frequency (RF) signals are utilized to transport a first map from the second vehicle detection system to the first vehicle detection system, and wherein processing the one or more radio-frequency (RF) signals to detect the third vehicle comprises processing the first map to detect the third vehicle.

16. The system of claim 13, wherein the first vehicle detection system is located in a first vehicle, and wherein the at least one processor is configured to access the at least one memory and execute additional computer-executable instructions comprising:
processing a first segment in the set of segments for determining one or more of a cardinal orientation of the third vehicle with respect to the first vehicle, a cardinal direction of travel of the third vehicle with respect to the first vehicle, and a cardinal separation distance between the third vehicle and the first vehicle.

17. The system of claim 13, wherein the first vehicle detection system is located in a first vehicle, and wherein the at least one processor is configured to access the at least one memory and execute additional computer-executable instructions comprising:
generating a second cardinal map comprising a location information of at least the second vehicle; and
determining a relative location of the third vehicle with respect to the first vehicle by comparing the second cardinal map to the first cardinal map, wherein the first cardinal map is partitioned into a first set of segments defined by a first user, and wherein the second cardinal map is partitioned into a second set of segments defined by a second user.

* * * * *